(12) United States Patent
Kim et al.

(10) Patent No.: US 10,579,872 B2
(45) Date of Patent: Mar. 3, 2020

(54) METHOD AND APPARATUS WITH IRIS REGION EXTRACTION

(71) Applicant: SAMSUNG ELECTRONICS CO., LTD., Suwon-si (KR)

(72) Inventors: Jihye Kim, Anyang-si (KR); Sungjoo Suh, Seoul (KR); Hyunjeong Lee, Hwaseong-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 15/682,988

(22) Filed: Aug. 22, 2017

(65) Prior Publication Data

US 2018/0137335 A1 May 17, 2018

(30) Foreign Application Priority Data

Nov. 11, 2016 (KR) .................. 10-2016-0150488

(51) Int. Cl.
*G06K 9/00* (2006.01)
*G06K 9/62* (2006.01)
(Continued)

(52) U.S. Cl.
CPC ........ *G06K 9/0061* (2013.01); *G06K 9/00604* (2013.01); *G06K 9/4628* (2013.01); *G06K 9/6257* (2013.01); *G06N 3/0454* (2013.01); *G06N 3/08* (2013.01); *G06K 9/50* (2013.01); *G06K 9/6267* (2013.01)

(58) Field of Classification Search
CPC .............. G06K 9/0061; G06K 9/6267; G06K 9/00604; G06K 9/00617; G06K 9/6257; G06N 3/08; G06N 3/04; G06N 7/005; G06F 21/32
See application file for complete search history.

(56) References Cited

U.S. PATENT DOCUMENTS 6,381,345 B1 * 4/2002 Swain ................ G06K 9/00221
348/E7.08
6,526,160 B1 * 2/2003 Ito ...................... G06K 9/00597
382/117
(Continued)

FOREIGN PATENT DOCUMENTS

| CN | 105279492 A | 1/2016 |
| JP | 4962470 B2 | 6/2012 |
| KR | 10-1302601 B1 | 8/2013 |

OTHER PUBLICATIONS

Bansal et al. "Artificial Neural Network Based Iris Recognition System." International Journal on Recent and Innovation Trends in Computing and Communication, vol. 2, Issue 10 (2014): 3243-3246.
(Continued)

*Primary Examiner* — Amir Alavi
(74) *Attorney, Agent, or Firm* — NSIP Law

(57) ABSTRACT

A method and apparatus for extracting an iris region is disclosed. The apparatus may generate a classification map associated with an iris region from an eye image using a trained neural network model, estimate a geometric parameter associated with the iris region using the generated classification map, and extract the iris region from the eye image based on the estimated geometric parameter.

30 Claims, 12 Drawing Sheets

(51) Int. Cl.
  *G06N 3/04* (2006.01)
  *G06K 9/46* (2006.01)
  *G06N 3/08* (2006.01)
  *G06K 9/50* (2006.01)

(56) References Cited

U.S. PATENT DOCUMENTS

| | | | |
|---|---|---|---|
| 8,768,014 B2 | 7/2014 | Du et al. | |
| 8,861,799 B2* | 10/2014 | Savvides | G06K 9/00597 |
| | | | 382/117 |
| 9,836,648 B2* | 12/2017 | Perna | G06K 9/00604 |
| 2006/0059365 A1* | 3/2006 | Harper | G06F 21/6245 |
| | | | 713/186 |
| 2006/0222214 A1* | 10/2006 | Kaneda | G06K 9/00335 |
| | | | 382/115 |
| 2009/0252382 A1 | 10/2009 | Liu et al. | |
| 2010/0070527 A1* | 3/2010 | Chen | G06F 16/70 |
| | | | 707/772 |
| 2010/0110374 A1* | 5/2010 | Raguin | G06K 9/0061 |
| | | | 351/206 |
| 2014/0334736 A1 | 11/2014 | Niu et al. | |
| 2015/0178547 A1* | 6/2015 | Bahjat | G06K 9/0061 |
| | | | 382/117 |
| 2016/0012275 A1 | 1/2016 | Bergen | |
| 2016/0019422 A1 | 1/2016 | Savvides et al. | |
| 2018/0018451 A1* | 1/2018 | Spizhevoy | G06F 21/32 |
| 2018/0137335 A1* | 5/2018 | Kim | G06K 9/00604 |

OTHER PUBLICATIONS

Zhoa et al. "An Accurate Iris Segmentation Framework Under Relaxed Imaging Constraints Using Total Variation Model." Proceedings of the IEEE International Conference on Computer Vision (2015):3828-3836.

Proenca, Hugo., "Iris Recognition: On the Segmentation of Degraded Images Acquired in the Visible Wavelength", IEEE Transactions on Pattern Analysis and Machine Intelligence, vol. 32, Issue 8, Aug. 2010 (pp. 1502-1516).

Liu, Nianfeng et al., "Accurate Iris Segmentation in Non-cooperative Environments Using Fully Convolutional Networks", *2016 International Conference on Biometrics (ICB)*, Jun. 2016, (8 pages in English).

Extended European Search Report dated Mar. 6, 2018 in corresponding European Application No. 17187626.1 (7 pages in English).

* cited by examiner

METHOD AND APPARATUS WITH IRIS REGION EXTRACTION

CROSS-REFERENCE TO RELATED APPLICATION(S)

This application claims the benefit under 35 USC § 119(a) of Korean Patent Application No. 10-2016-0150488 filed on Nov. 11, 2016, in the Korean Intellectual Property Office, the entire disclosure of which is incorporated herein by reference for all purposes.

BACKGROUND

1. Field

The following description relates to methods and apparatuses that include iris region extracting technology.

2. Description of Related Art

Recently, interest in technology for verifying an identity of a user using a biometric feature has been increasing. Biometric authentication technology, such as, for example, facial recognition, fingerprint recognition, vein pattern recognition, and iris recognition, is used to verify an identity of a user using a unique biometric feature different from individual to individual. While facial recognition and the fingerprint recognition are widely used, iris recognition has been gaining attention.

Iris recognition is a type of contactless recognition method, and is used to recognize a user by analyzing an iris pattern of the user. Iris patterns may differ between a left eye and a right eye of a same user, and differ between identical twins having a same genetic structure, but otherwise iris patterns may not greatly vary over time. In iris recognition, an iris region distinguished from a pupil and a sclera may be extracted from an image that includes a user's eye(s), and features may be extracted from the extracted iris region. Such features may be compared to registered features and the user may be authenticated if the results of the comparisons are within a threshold, for example.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented iris region extraction method includes obtaining an eye image, extracting an iris region from the obtained eye image using a trained neural network model.

The method may further include obtaining an image that includes an eye and performing a cropping of the image to obtain the eye image, extracting features from the extracted iris region, and matching the extracted features to registered iris information.

The trained neural network may be a neural network with one or more convolutional hidden layers, and may be trained based on a backpropagation method that uses training eye image information that is labeled with respect to different classifications for at least corresponding pupil and iris regions or labeled with respect to corresponding pupil and iris geometric parameters.

The extracting of the iris region may include performing a first segmentation of the eye image by providing a lower resolution image of the eye image to a first trained neural network, performing a second segmentation of the eye image using a second trained neural network, the second segmentation of the eye image being dependent on results of the first segmentation of the eye image, and extracting the iris region from the eye image based on results of the second segmentation.

The extracting of the iris region may include extracting pixels corresponding to the iris region from the eye image as an output of the trained neural network model.

The extracting of the iris region may include generating a first classification map associated with the iris region from the eye image using the trained neural network model, estimating one or more geometric parameters associated with the iris region using the generated first classification map, and extracting the iris region from the eye image based on the estimated one or more geometric parameters.

The estimating of the one or more geometric parameters may include performing a fitting operation of one or more geometric equations to the first classification map, the fitting may include estimating geometric parameters of at least one of a circle, ellipse, or a curve that are fitted to features of the first classification map.

The one or more geometric parameters may include plural geometric parameters, including a first parameter to define a shape of a first circle or a first ellipse corresponding to an outer boundary of the iris region represented in the first classification map and a second parameter to define a shape of a second circle or a second ellipse corresponding to a boundary between the iris region and a pupil region represented in the first classification map.

The plural geometric parameters may further include at least one of a third parameter to define a shape of a first curve corresponding to an upper eyelid or a fourth parameter to define a shape of a second curve corresponding to a lower eyelid.

The extracting of the iris region may include generating a second classification map based on the estimated one or more geometric parameters, and extracting the iris region from the eye image using the generated second classification map.

The extracting of the iris region may include generating a lower-resolution image of the eye image, generating a classification map associated with the iris region from the lower-resolution image using the trained neural network model, estimating one or more geometric parameters associated with the iris region using the generated classification map, and extracting the iris region from the eye image based on the estimated one or more geometric parameters.

The generating of the lower-resolution image of the eye image may be performed by changing a resolution of the eye image to generate the lower-resolution image.

The estimating of the one or more geometric parameters may include adjusting a size of the classification map to match a size of the eye image, and estimating the one or more geometric parameters using the adjusted size classification map.

The extracting of the iris region may include generating a lower-resolution image of the eye image, generating a classification map associated with the iris region from the generated lower-resolution image using a first trained neural network model, determining a plurality of refinement regions in the eye image using the generated classification map, extracting pixels from the refinement regions using a second trained neural network, and extracting the iris region from the eye image based on a result of the extracting of the pixels.

The determining of the refinement regions may include determining the refinement regions in the eye image based on the classification map and structural information predefined with respect to iris regions.

The extracting of the iris region may include estimating one or more geometric parameters associated with the iris region based on the result of the extracting of the pixels, and extracting the iris region from the eye image based on the estimated one or more geometric parameters.

The extracting of the iris region may include generating a lower-resolution image of the eye image, obtaining a geometric parameter associated with the iris region from the generated lower-resolution image using a first trained neural network model, determining a plurality of refinement regions in the eye image using the obtained geometric parameter, extracting pixels from the refinement regions using a second trained neural network model, and extracting the iris region from the eye image based on a result of the extracting of the pixels.

The extracting of the iris region may include estimating one or more geometric parameters associated with the iris region based on the result of the extracting of the pixels, and extracting the iris region from the eye image based on the estimated one or more geometric parameters.

The extracting of the iris region may include obtaining a geometric parameter associated with the iris region from the eye image using the trained neural network model, and extracting the iris region from the eye image based on the obtained geometric parameter.

The method may further include respectively analyzing a first eye image, which is a captured color image of an eye of a user, and a second eye image, which is a captured infrared image of the eye of the user, and selecting one of the first eye image and the second eye image to be the obtained eye image.

The obtaining of the eye image may include extracting a region of interest (ROI), including the iris region, from the input image, as the obtained eye image.

In one general aspect, one or more embodiments include a non-transitory computer-readable storage medium storing instructions that, when executed by a processor, cause the processor to perform one or more or all operations described herein.

In one general aspect, an apparatus includes one or more processors configured to extract an iris region from an obtained eye image using a trained neural network model.

The apparatus may further include at least one camera controlled by the one or more processors to obtain the eye image.

The trained neural network may be a neural network with one or more convolutional hidden layers, and may be trained based on a backpropagation method that uses training eye image information that is labeled with respect to different classifications for at least corresponding pupil and iris regions or labeled with respect to corresponding pupil and iris geometric parameters.

The processor may be configured to perform the training of the neural network model.

The apparatus may further include a memory that may store the trained neural network model.

The processor may be configured to generate a classification map associated with the iris region from the eye image using the trained neural network model, estimate one or more geometric parameters associated with the iris region using the generated classification map, and extract the iris region from the eye image based on the estimated one or more geometric parameters.

To estimate the one or more geometric parameters, the one or more processors may be configured to perform a fitting operation of one or more geometric equations to the classification map, and the fitting may include estimating geometric parameters of at least one of a circle, ellipse, or a curve that are fitted to features of the classification map.

The one or more geometric parameters may include plural geometric parameters, including a first parameter to define a shape of a first circle or a first ellipse corresponding to an outer boundary of the iris region represented in the classification map and a second parameter to define a shape of a second circle or a second ellipse corresponding to a boundary between the iris region and a pupil region represented in the classification map.

The processor may be configured to generate a lower-resolution image of the eye image, generate a classification map associated with the iris region from the generated lower-resolution image using a first trained neural network model, with the classification map having a lower resolution than the eye image, determine a plurality of refinement regions in the eye image using the generated classification map, extract pixels from the refinement regions using a second trained neural network model, and extract the iris region from the eye image based on a result of the extracting of the pixels.

The processor may be configured to generate a lower-resolution image of the eye image, obtain a geometric parameter associated with the iris region from the generated lower-resolution image using a first trained neural network model, determine a plurality of refinement regions in the eye image using the obtained geometric parameter, extract pixels from the determined plural refinement regions using a second trained neural network model, estimate one or more geometric parameters associated with the iris region based on a result of the extracting of the pixels, and extract the iris region from the eye image based on the estimated one or more geometric parameters.

In one general aspect, a processor implemented iris region extraction method includes providing a first image for an eye to a first trained neural network to generate an output of the first trained neural network, estimating one or more geometric parameters by performing a fitting operation of one or more geometric equations using the output of the first trained neural network, the fitting including estimating geometric parameters of at least one of a circle, ellipse, or a curve for an iris region of the eye, and extracting the iris region from a second image for the eye based on the estimated one or more geometric parameters.

The extracting of the iris region may include determining a plurality of refinement regions in the second image based on the estimated one or more geometric parameters, extracting pixels from the refinement regions using a second neural network model, and extracting the iris region from the second image based on a result of the extracting of the pixels.

The extracting of the iris region may include estimating at least one geometric parameter associated with the iris region based on the result of the extracting of the pixels, and extracting the iris region from the second image based on the estimated at least one geometric parameter.

The one or more geometric parameters may include plural geometric parameters, including a first parameter to define a shape of a first circle or a first ellipse corresponding to an outer boundary of the iris region represented in the output of the first trained neural network and a second parameter to define a shape of a second circle or a second ellipse corresponding to a boundary between the iris region and a pupil region represented in the output of the first trained neural network.

The first image may be an infrared image. The second image may be a color image.

Other features and aspects will be apparent from the following detailed description, the drawings, and the claims.

Figure 1:
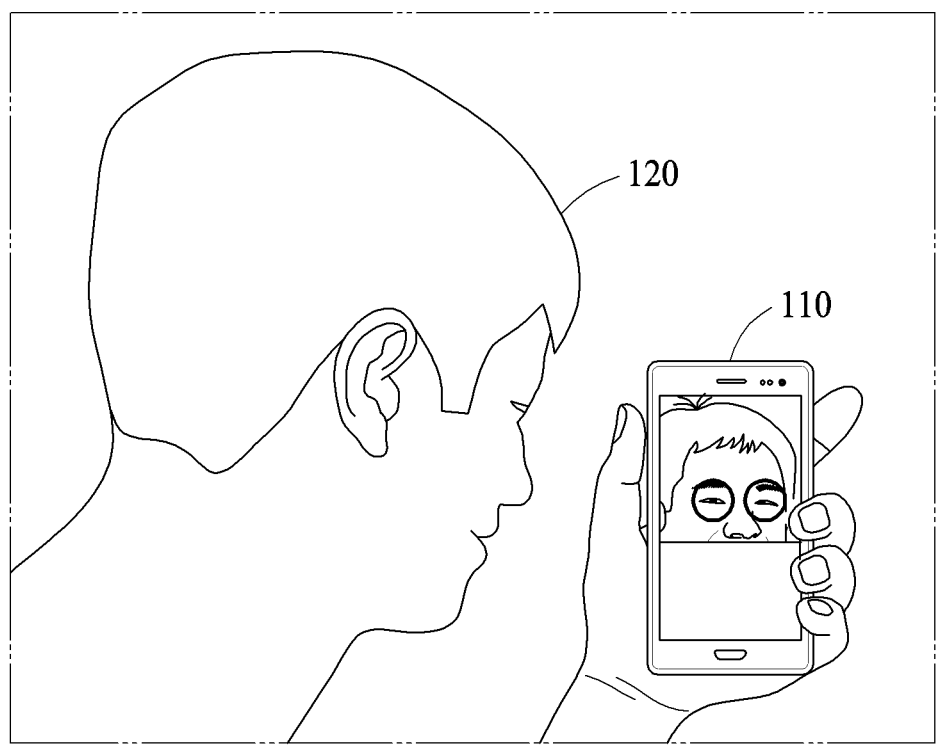
FIG. 1 is a diagram illustrating an example of an iris recognition apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof in at least one embodiment, such as when it is indicated that such stated features, numbers, operations, elements, components, and/or combinations thereof may be included in an example. However, the use of the terms "include," "comprise," and "have" in the Specification do not preclude the presence or addition of one or more other features, numbers, operations, elements, components, and/or combinations thereof in other embodiments, and do not preclude in the Specification the lack of presence of any of such features, numbers, operations, elements, components, and/or combinations thereof in still other embodiments unless explicitly or contextually/implicitly clearly explained otherwise.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

A function or an operation illustrated in a block may be performed not in a sequential order according to examples. For example, functions or operations illustrated in successive blocks may be actually performed concurrently, or an order of the blocks may be changed based on related functions or operations.

FIG. 1 is a diagram illustrating an example of an iris recognition apparatus.

Herein, iris recognition refers to biometrics technology that, depending on embodiment, may include performing an authentication of a user using a pattern of an iris present between a pupil in the middle of an eye of the user and a sclera of the user. In differing embodiments, the iris recognition may include, for example, authentication of a user login, mobile payment, and access control. The iris recognition may include obtaining an eye image and recognizing an iris in the obtained eye image, and the iris recognition may also include the obtaining of the eye image, the recognizing of the iris, and the performing of one or more such authentication operations. The recognizing of the iris may include extracting an iris region, extracting a feature of the iris, and performing a matching of the extracted feature with one or more registered iris' features, for example.

Referring to FIG. 1, a computing apparatus 110 performs an authentication operation for a user 120 trying to access the computing apparatus 110 through iris recognition. For example, the user 120 may make an attempt at iris recognition-based user authentication in the computing apparatus 110 to unlock the computing apparatus 110, password entry for applications executed by the computing apparatus 110, or authorizing payments or other financial transactions by authenticating the user as an authorized person for such payments or transactions. The iris recognition may also be implemented for one or more users, such as multiple people captured in a social photograph, which may be captured by the camera of the computing apparatus 110, such as for automated categorizing or identification of users in an executed photo album or social networking application of the computing apparatus 110, for example. The computing apparatus 110 may obtain an eye image including an eye region of the user 120 using an image acquirer, for example, an infrared camera and a charge-coupled device (CCD) camera, and analyze an iris pattern of an iris in the obtained eye image to allow or reject the user authentication, i.e., as a result of the authentication operation. The camera may also be a color camera or gray scale camera, or the captured image may selectively be a color image, a single color image, a gray scale image, etc., and the computing apparatus may include multiple such different cameras. The computing apparatus 110 may compare a feature of the iris pattern in the eye image to a registered iris pattern feature stored in a non-transitory memory of the computing apparatus 110, or otherwise made available to or accessed by the computing apparatus 110, and the computing apparatus 110 may determine whether to authenticate the user 120 based on a result of the comparing. In any of the described examples, the extracted iris may also be stored in a memory of the computing apparatus 110, and may also be provided to an external device that may perform the authentication operation. The computing apparatus 110 may also be configured to register an iris extracted to any of the described examples herein, e.g., for a subsequent use for authentication comparisons with other extracted irises. The computing apparatus 110 may be, for example, a smartphone, a wearable device, a tablet computer, a netbook, a laptop, a desktop, a personal digital assistant (PDA), a set-top box, a home appliance, an automated teller machine (ATM), a door lock or door/area entry/access system, a security device, and a vehicle starting device, and may be configured as illustrated in any FIGS. 1, 11, and 12, for example. As only an example, an embodiment where the computing apparatus 110 is a smartphone is illustrated in FIG. 1.

In one example, in a case that the computing apparatus 110 operates in a locked mode, e.g., preventing access to other functional operations of the computing apparatus 110, the computing apparatus 110 may be controlled, or automatically perform, an authentication operation of the user 120 through iris recognition. When the user 120 is allowed, e.g., if the computing apparatus is configured to permit iris authentication, the user 120 may unlock the computing apparatus 110 through the iris recognition performed by the computing apparatus 110. The iris recognition may be performed upon user interaction or manipulation of the computing apparatus, or the recognition may be automatically performed. The user 120 may register or store, in advance, biometric information associated with an iris of the user 120 in the computing apparatus 110, and the computing apparatus 110 may store the biometric information associated with the iris of the user 120 in a storage or a cloud storage. Embodiments include such registering and storing of the biometric information associated with one or both of the irises of the user 120. When the user 120 presents an eye of the user 120 to the image acquirer of the computing apparatus 110 to unlock the computing apparatus 110, the computing apparatus 110 may extract a feature of the iris indicated in an iris pattern from an image including an eye region of the user 120, and verify whether the extracted feature matches a registered feature. When the extracted feature matches the registered feature, the computing apparatus 110 may cancel the lock mode and allow access to the user 120 of further functions of the computing apparatus 110. Conversely, when the extracted feature does not match the registered feature, the computing apparatus 110 may maintain the lock mode and restrict the user 120 from accessing additional functions of the computing apparatus 110 or from accessing data stored in the computing apparatus 110.

To extract the feature of the iris of the user 120 by the computing apparatus 110, the computing apparatus 110 may be configured to extract an iris region from the image, noting that embodiments are not limited to the computing apparatus 110 and other computing apparatuses may be configured to extract the iris region, depending on embodiment. Thus, hereinafter, such computing apparatuses may simply be referred to as an iris region extracting apparatus. In addition, in one example, such an iris region extracting apparatus may be a component of the computing apparatus 110, or represented by the computing apparatus 110 itself, and extract the iris region from an eye image or a face image obtained by the example image acquirer of the computing apparatus 110 or provided from an external image acquirer. For example, in one or more embodiments, the iris region extracting apparatus may extract, more accurately and rapidly, the iris region from the image using a neural network model trained based on training data, e.g., compared to previous approaches, such as where edge detection operations are performed and the iris region boundaries being identified based on the detected edges. Herein, the iris extraction methods may be performed for either or both of the registration of irises and/or iris features and for authentication operations that compare features of extracted iris regions to previously registered iris features, including such alternate methods being performed by the same or different apparatuses. A method of extracting an iris region, hereinafter simply referred to as an iris region extracting method, which may be performed by such an example iris region extracting apparatus, noting that embodiments are not limited thereto.

Figure 2:
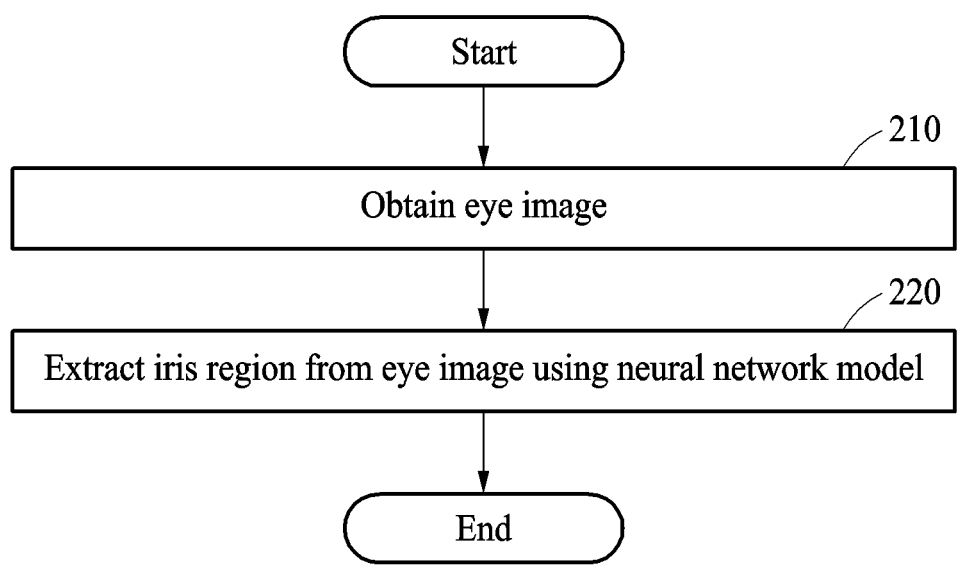
FIG. 2 is a flowchart illustrating an example iris region extraction method.

FIG. 2 is a flowchart illustrating an example iris region extraction method.

Referring to FIG. 2, in operation 210, an iris region extracting apparatus obtains an eye image. For example, the iris region extracting apparatus may capture the eye image using a camera or receive the eye image from an external source. The eye image refers to an image including at least an eye region of a user and may be, for example, a color image, a gray image, and an infrared image. In an example, the iris region extracting apparatus may receive, as an input image, at least a face image including a face region or a face image including a portion of the face region, and obtain an eye image by extracting a region of interest (ROI) including an iris region from the input image.

In an example, the iris region extracting apparatus may obtain a first eye image, which is a captured color image of an eye of a user, and a second eye image, which is a captured infrared image of the eye of the user, and selects a target image from which an iris region is to be extracted from the obtained first eye image and the obtained second eye image. For example, in a case that an eye region in the first eye image is determined to include an artifact, for example, a light blur, the iris region extracting apparatus may select the second eye image as the target image from which the iris region is extracted. For another example, in a case that the first eye image is determined to have a greater quality than the second eye image, the iris region extracting apparatus may select the first eye image as the target image from which the iris region is extracted. In still another example, the iris region extracting apparatus may perform iris extraction discussed herein for both example eye images. Here, though the first and second eye images are referred to as being different types of captured images, e.g., color versus infrared, alternatively the example first and second eye images may be both color images or both infrared images, and the first and second eye images may be obtained or captured at a same time or at different times.

In operation 220, the iris region extracting apparatus extracts an iris region from the obtained eye image using a neural network model, or a deep neural network model. For example, compared to a neural network model, a deep neural network model may be a neural network that has more than one hidden layer. The neural network model may be configured as a classifier to provide information to be used to determine the iris region based on image information of the eye image input to the neural network model. The image information of the eye image may be information associated with a pixel value of each of pixels included in the eye image, for example, a color value and a brightness value, and an infrared detection value in a case of the eye image being the infrared image.

An output of the neural network model may be a geometric parameter or geometric parameters that can be used to extract or classify pixels corresponding to the iris region from the eye image or define the iris region. In such examples, the neural network model may provide or generate a classification map in which the iris region is distinguished from the eye image, or may output a parameter(s) of a circle or curve equations that can be considered or used as representations of or defining a boundary of the iris region. For example, for generating or identifying the geometric parameters of the pupil and iris, the neural network may be a regression-based neural network, which includes one or more convolutional neural network hidden layers followed by one or more fully connected neural network hidden layers. In such an example, an embodiment includes training the neural network using labeled training input images, e.g., for which pupil and iris parameters are known. The classification map may be a map or an image indicating which class or region a pixel of the eye image belongs to. For example, the classification map may indicate which class or region, for example, a pupil region, an iris region, and a background excluding the pupil region and the iris region, a pixel of the eye image belongs to. In an example, a corresponding classification-based neural network may include one or more convolution neural network hidden layers followed by one or more fully connected neural network hidden layers, for example, such that the classification map or mapping may be output. For example, an input image patch may be provided to the classifying neural network model and the neural network model may identify or output a classification of a k-th pixel of the patch. In such an example, the classification-based neural network model may be trained based on labeled training input patch images, e.g., for which a classification of corresponding k-th pixels are known.

Thus, as an example of the neural network model, a neural network model configured to classify a region by a pixel unit, calculate a parameter associated with the region, or to output an image corresponding to the eye image may be used. For example, the neural network model described in the foregoing may include a SegNet and a fully convolutional network (FCN) that is configured to output an image obtained as a result of classification from an input image through multiple convolution neural network hidden layers, or through one or more convolution and one or more deconvolution neural network hidden layers. The output image may also include classification between the pupil, iris, and parts of the eye other than the pupil and the iris. Embodiments include the training of the fully convolutional neural network or the convolutional-deconvolutional neural network, such as based on labeled input eye images where such different classifications are known or the output classified image is known. Alternatively, as noted above, a neural network model configured to classify a k-th or central pixel of a partial patch image of an input image into each class or region, for example, a pupil region, an iris region, or a background region may be used. In a case of using the partial patch image, pixel classification may be performed based on information on surrounding or neighborhood regions, and thus accuracy in the pixel classification may be improved and an accurate result of the pixel classification may be obtained despite large amounts of noise in the eye image and/or low contrast in the eye image. Additionally, as only an example and as noted above, when the neural network model is configured to provide a geometric parameter(s) associated with a target that is to be classified in the input image, for example, the iris region, the neuro network model may be a regression-based neural network model.

The neural network model may be trained in advance through a training or learning process based on a plurality of pieces of training data, or trained through an on-device deep learning process performed in a device, for example, the computing apparatus 110 of FIG. 1. For example, each of the differently described neural network models may be respectively trained based on the labeled input image information or desired corresponding output images, classifications, or geometric parameters, such as through a backpropagation algorithm, e.g., where connection weightings between nodes of different hidden layers are recursively adjusted until the corresponding neural network model is trained. The respectively trained neuro network may be stored in a memory of the iris region extracting apparatus. For example, the trained neural network may be stored in a trained matrix format, where elements of the matrix represent the corresponding trained weighted connections of the corresponding neural network structure. The stored trained neural network may further include hyper-parameter information, which may define the structure of the corresponding neural network for which the example stored trained matrix correspond to. The hyper-parameters may define how many hidden layers, how many and respect structures of the convolutional, deconvolutional, and/or fully connected hidden layers of the neural network structure, the use of any bias and/or contextual nodes, and their structure within the neural network, and define any recurrent structures of the neural network, which may vary depending on embodiment.

Accordingly, in an example, the iris region extracting apparatus may extract the iris region from the eye image based on a classification map or geometric parameter(s) obtained using one or more neural network models. Subsequent to operation 220, an iris feature, for example, an iris code, may be determined through normalization and filtering performed on the extracted iris region, and a result of user authentication may be determined based on a determined similarity between the determined iris feature and a registered iris feature(s), e.g., of authorized or previously authenticated users. Thus, the iris region extracting apparatus may extract, more rapidly and accurately, the iris region from the eye image using such neural network models. In addition, in one or more embodiments, any one or multiple such neural networks may be respectively used for different stages of the iris region extraction, such as with one neural network configuration being implemented for a first segmentation operation and a second neural network configuration being implemented for a second segmentation operation that is dependent on results of the first segmentation operation.

Hereinafter, various examples of processes of extracting an iris region by an iris region extracting apparatus using one or more of such described example neural network models implemented in operation 220 will be described in greater detail below, with example implementations of operation 220 being demonstrated in each of FIGS. 3-10, described in greater detail below.

Figure 3:
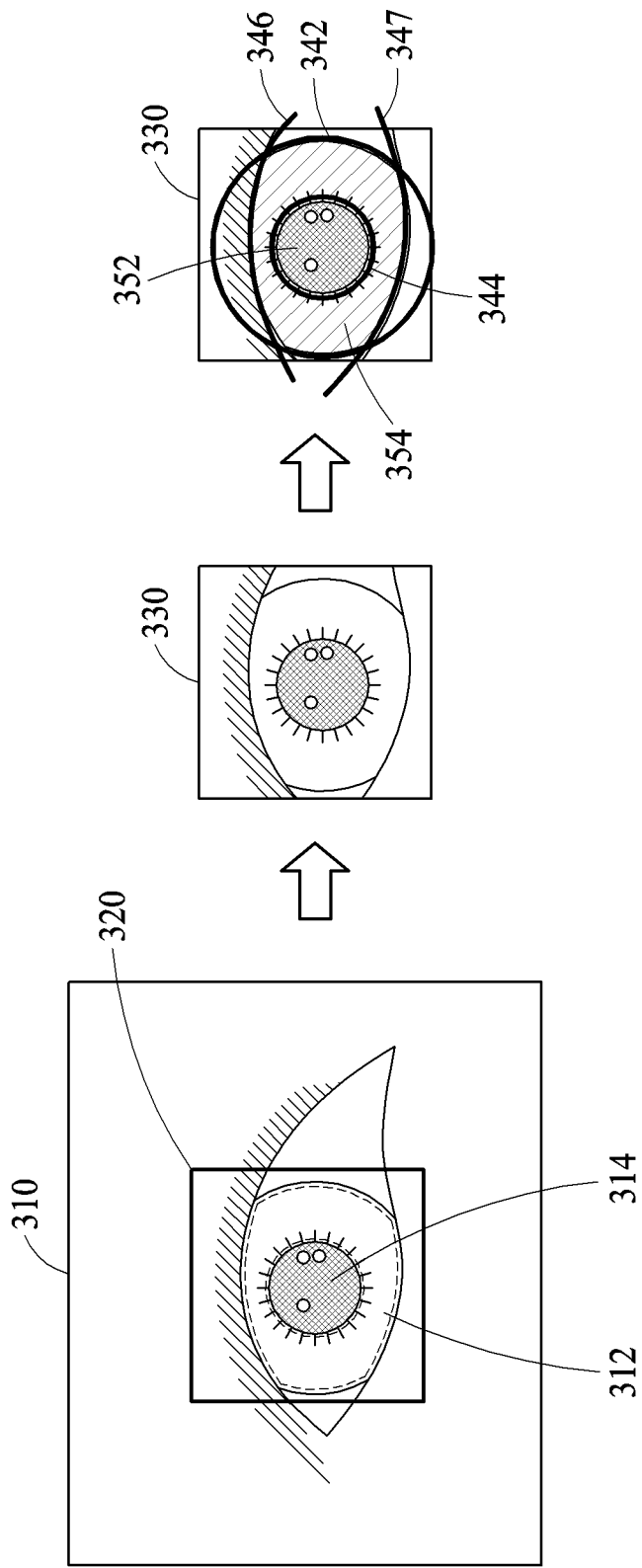
FIG. 3 is a diagram illustrating an example iris region extraction method.

FIG. 3 is a diagram illustrating an example iris region extraction method.

Referring to FIG. 3, the iris region extracting apparatus extracts an ROI 320 from an input image 310. The ROI 320 is a partial region of the input image 310 that includes a pupil region 314 and an iris region 312. The iris region extracting apparatus extracts an iris region 354 from an image 330 of the ROI 320 using a neural network model, such as any of the aforementioned neural networks or combination of neural networks described with respect to FIG. 2. Here, the image 330 is referred to as an eye image 330. In one example, image information of the eye image 330 may be input to the neural network model, and geometric parameters to define a shape of an iris region may be determined based on an output result of the neural network model. For example, as illustrated in FIG. 3, the geometric parameters include parameters to define a first circle 342 corresponding to an outer boundary of the iris region, a second circle 344 corresponding to a boundary between the iris region and a pupil region 352, a first curve 346 corresponding to an upper eyelid, and a second curve 347 corresponding to a lower eyelid. The iris region extracting apparatus may extract, as an iris region 354 from the eye image 330, a region surrounded by the first circle 342, the second circle 344, the first curve 346, and the second curve 347. Thus, using the neural network model, the iris region extracting apparatus may, more accurately and rapidly, extract the iris region 354 from the eye image 330.

There may be a situation where an iris region may not be occluded by an upper eyelid or a lower eyelid. In such a case, a parameter of at least one of the first curve 346 or the second curve 347 may not be determined. Here, the iris region extracting apparatus may extract the iris region 354 from the eye image 330 only using parameters of the first circle 342 and the second circle 344, or additionally using parameters of one of the first curve 346 and the second curve 347 in addition to the parameters of the first circle 342 and the second circle 344.

Figure 4:
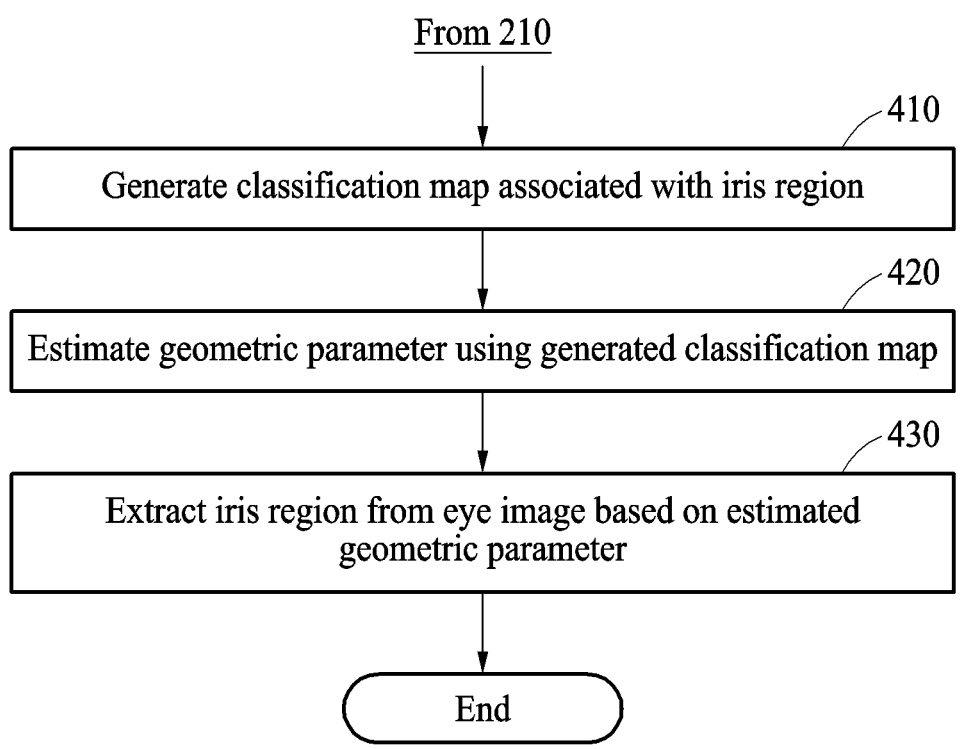
FIG. 4 is a flowchart illustrating an example iris region extraction method.

FIG. 4 is a flowchart illustrating an example iris region extraction method.

Referring to FIG. 4, in operation 410, the iris region extracting apparatus generates a classification map associated with an iris region from an eye image using a neural network model, such as any of the aforementioned neural networks or combination of neural networks described with respect to FIG. 2. In response to image information of the eye image being input to the neural network model, the neural network model may extract pixels from the eye image with respect to their determined or inferred class or region by the neural network model, and the classification map may be generated based on a result of the extracting of the pixels. For example, in response to image information of each patch region of the eye image being input to the neural network model, the neural network model may determine or infer, i.e., based on the previous training of the neural network, which of an iris region, a pupil region, and a background region a central pixel of each patch region belongs to. The background region refers to a region that is not the iris region and not the pupil region, and may include a sclera region and a region occluded by an eyelid. In response to the extracting being completed on all the pixels of the eye image, for example, the classification map indicating which pixels of the eye image belong to each of the pupil region, the iris region, and the background region may be generated. The number of classes into which the pixels are classified may vary depending on embodiment. As described above, in the classification map, the pixels may be classified into three example classes, for example, the iris region, the pupil region, and the background region, or into two classes, for example, the iris region and a non-iris region. For another example, the pixels may be classified into four or more classes. Thus, though an example of classification of pixels into three classes is described herein, it should be understood that embodiments are not limited thereto.

In operation 420, the iris region extracting apparatus estimates one or more geometric parameters associated with the iris region using the generated classification map. For example, the iris region extracting apparatus may determine a circle, ellipse, and/or curve equation or shape to define the iris region by fitting one or more geometric models, for example, a circle, ellipse, and/or curve to the classification map. The geometric parameters may include some or all of, for example, a first parameter of a first circle or a first ellipse corresponding to an outer boundary of the iris region, a second parameter of a second circle or a second ellipse corresponding to a boundary between the iris region and the pupil region, a third parameter of a first curve corresponding to an upper eyelid, and a fourth parameter of a second curve corresponding to a lower eyelid. The first parameter and the second parameter may respectively include a coefficient to define a circle or an ellipse, such as central coordinates and a radius of the circle or focal coordinates and lengths of a major axis and a minor axis of the ellipse. The third parameter and the fourth parameter may include a coefficient to define the curve, for example.

Herein, described example circle, ellipse, and/or curve fitting examples may be implemented by any typical fitting operations, such as those that construct a curve, or mathematical function, that has the best fit to a series of data points, and which may also be subject to constraints, such as the aforementioned predetermined geometric properties/ boundaries of a human eye and/or the boundaries between the differently classified regions of the eye image or the classification map. The respective fitting operations may include interpolation, extrapolation, and/or smoothing, for example. The fitting operations may also be based on respectively set thresholds for example, where the fitting operations are performed until a minimum uncertainty is present in the fitted circle, ellipse, or curve. In addition, though geometric parameters are discussed with respect to circles, ellipses, or curves geometric objects/equations, embodiments are not limited thereto, and the geometric models may be based on other geometric objects/equations. In another example, the fitted curves may be portions of one or more degreed polynomial curves, for example.

In operation 430, the iris region extracting apparatus extracts the iris region from the eye image based on the estimated geometric parameter(s). For example, the iris region extracting apparatus may define a region surrounded by the outer boundary of the iris region, the boundary between the iris region and the pupil region, and the eyelids, using the geometric parameters, and extract or determine the defined region from the eye image as the iris region.

In another example, the iris region extracting apparatus may generate a final classification map based on the geometric parameters, and extract the iris region from the eye image using the generated final classification map. The iris region extracting apparatus may generate the final classification map in which the iris region, the pupil region, and the background region are defined based on the geometric parameters, and apply the generated final classification map to the eye image to extract the iris region corresponding to the iris region in the final classification map.

Figure 5:
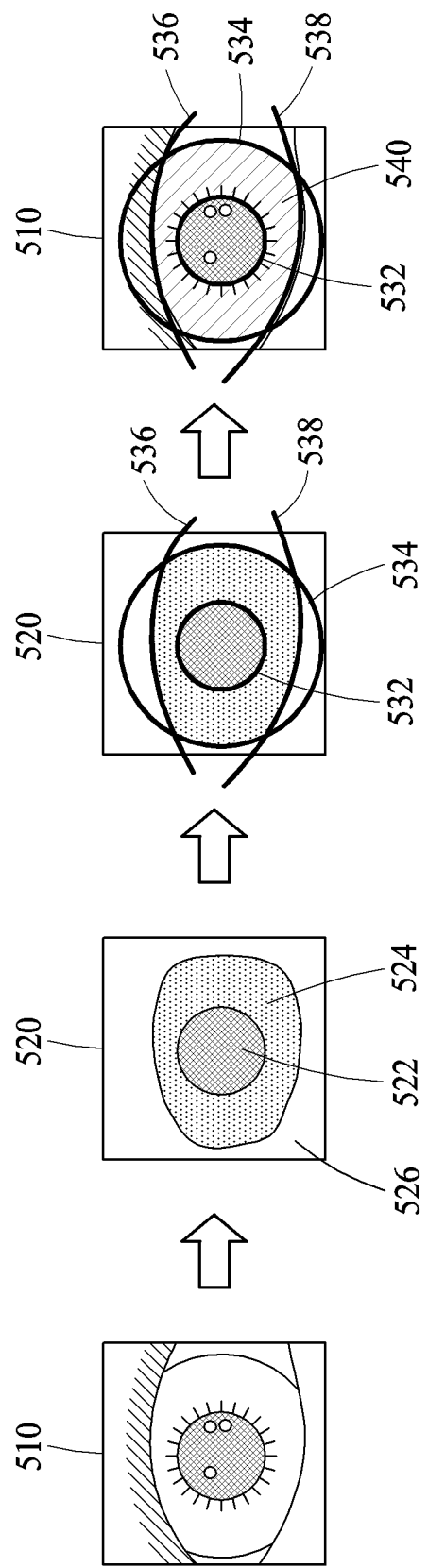
FIG. 5 is a diagram illustrating an example iris region extraction method.

FIG. 5 is a diagram illustrating an example iris region extraction method, such as the iris extraction method described with reference to FIG. 4, for example.

Referring to FIG. 5, the iris region extracting apparatus obtains a classification map 520 from an eye image 510 using a neural network model, such as any of the aforementioned neural networks or combination of neural networks described with respect to FIG. 2. The neural network model extracts pixels from the eye image 510 based on the neural network's determined or inferred respective regions for the pixels of the eye image, i.e., based on the previous training of the neural network, and generates or outputs the classification map 520 associated with an iris region based on a result of the extracting of the pixels. The classification map 520 indicates which region, for example, a pupil region 522, an iris region 524, and a background region 526, each pixel of the eye image 510 has been classified by the neural network as belonging to.

The iris region extracting apparatus estimates geometric parameters to be used to define the iris region in the eye image 510 using the classification map 520. For example, the iris region extracting apparatus fits a circular geometric model to the classification map 520, and estimates a first circle 534 corresponding to an outer boundary of the iris region 524 and a second circle 532 corresponding to a boundary of the pupil region 522 (or a boundary between the pupil region 522 and the iris region 524). According to an example, an elliptical geometric model, in lieu of the circular geometric model, may be used for the fitting and geometric parameters of an ellipse may be estimated. The iris region extracting apparatus fits a curved geometric model to a boundary between an iris in an eyelid and the eyelid, and estimates a first curve 536 corresponding to an upper eyelid and a second curve 538 corresponding to a lower eyelid. A region 540 in the eye image 510 to be defined by the first circle 534, the second circle 532, the first curve 536, and the second curve 538 is extracted as the iris region of the eye image 510. Subsequently, an iris feature may be extracted based on the extracted region 540, and iris recognition may be performed based on the extracted iris feature.

Figure 6:
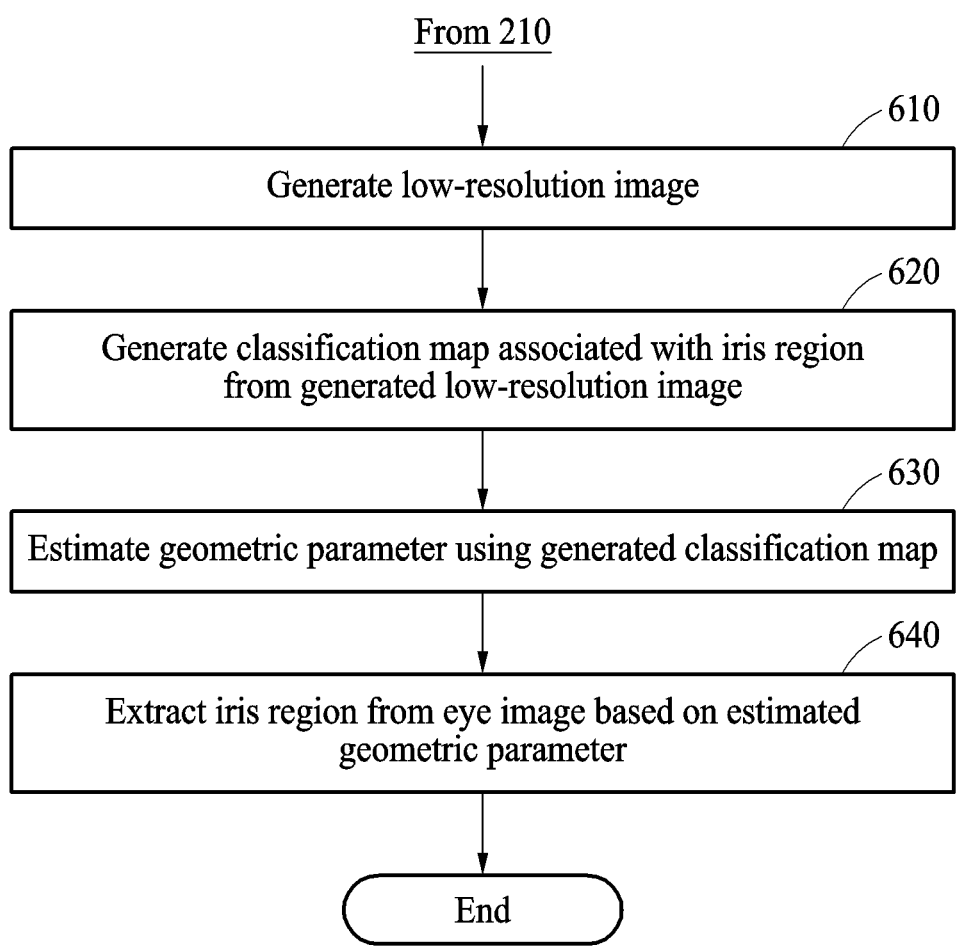
FIG. 6 is a flowchart illustrating an example iris region extraction method.

FIG. 6 is a flowchart illustrating an example iris region extraction method.

Referring to FIG. 6, in operation 610, the iris region extracting apparatus generates a low-resolution image with a resolution lower than a resolution of an eye image by changing the resolution of the eye image, or uses select pixel information from the eye image for representing a lower resolution eye image. In an example, the iris region extracting apparatus may generate the low-resolution image of the eye image through image compression or image downsampling of the eye image. As a result of the image compression or the image downsampling, a size of the low-resolution image may be smaller than a size of the eye image.

In operation 620, the iris region extracting apparatus generates a classification map associated with an iris region from the generated low-resolution image using a neural network model, such as any of the aforementioned neural networks or combination of neural networks described with respect to FIG. 2. Similarly to operation 410 described with reference to FIG. 4, image information of the low-resolution image may be input to the neural network model, and the neural network model may extract pixels from the low-resolution image based on a determined or inferred class or region, or classify pixels included in the low-resolution image into the respective classes. As a result of the extracting, the classification map of the low-resolution image that indicates which region, for example, a pupil region, an iris region, and a background region, each pixel in the low-resolution image has been classified by the neural network as belonging to.

In operation 630, the iris region extracting apparatus estimates geometric parameter(s) associated with the iris region using the generated classification map. In one example, the iris region extracting apparatus may adjust a size of the classification map to correspond to the size of the eye image, and estimate the geometric parameter(s) using the classification map of which the size is adjusted. For example, the classification map may be resized in a reverse manner and extent that the eye image had been compressed or downsampled to generate the lower resolution eye image, such that the resized classification map has the same dimensions of the eye image. The iris region extracting apparatus may estimate a geometric parameter by fitting a geometric model, such as, for example, a circle or an ellipse and a curve, to the classification map of which the size is adjusted. In operation 640, the iris region extracting apparatus extracts the iris region from the eye image based on the estimated geometric parameter. For a detailed description of operations 630 and 640, reference may be made to the description of operations 420 and 430 of FIG. 4, and thus a more detailed and repeated description of operations 630 and 640 is omitted here. In an alternative example, the geometric model fitting may be performed from the classification map, and the resultant fitted geometric model adjusted to take into consideration the difference in resolutions or dimensions between the lower resolution eye image and the eye image.

Figure 7:
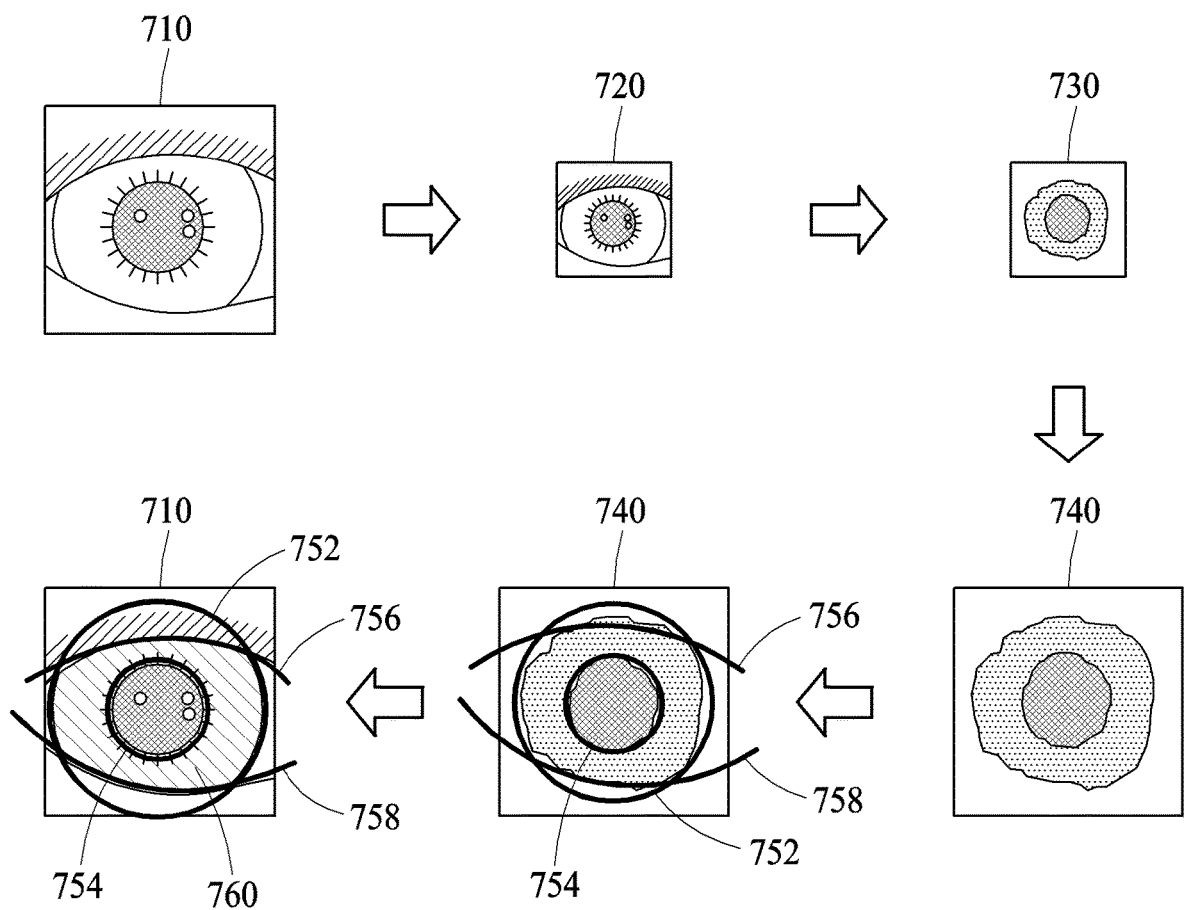
FIG. 7 is a diagram illustrating an example iris region extraction method.

FIG. 7 is a diagram illustrating an example iris region extraction method, such as the iris region extraction method described with reference to FIG. 6, for example.

Referring to FIG. 7, the iris region extracting apparatus generates a low-resolution image 720 by changing a resolution of an eye image 710. The iris region extracting apparatus generates a low-resolution classification map 730 from the generated low-resolution image 720 using a neural network model, such as any of the aforementioned neural networks or combination of neural networks described with respect to FIG. 2. Here, a low or lower resolution indicates that a resolution of the classification map 730 is relatively lower than the classification map 520 illustrated in FIG. 5, for example, which may have a same or similar resolution or dimensions of the eye image. Subsequently, the iris region extracting apparatus adjusts a size of the classification map 730 to be a size of the eye image 710 through image scaling or image interpolation. Thus, with the increasing of the size of the classification map 730, the resolution of the classification map 730 may become identical to the resolution of the eye image 710, such as otherwise described herein. The iris region extracting apparatus determines geometric parameters 752, 754, 756, and 758 to define an iris region by fitting a geometric model to a classification map 740 of the increased size. Accordingly, the iris region extracting apparatus extracts, as the iris region from the eye image 710, a region 760 defined by the geometric parameters 752, 754, 756, and 758. A process of determining geometric parameters and extracting a region defined by the geometric parameters as an iris region is described above, and thus further detailed and repeated descriptions of the same are omitted here.

Figure 8:
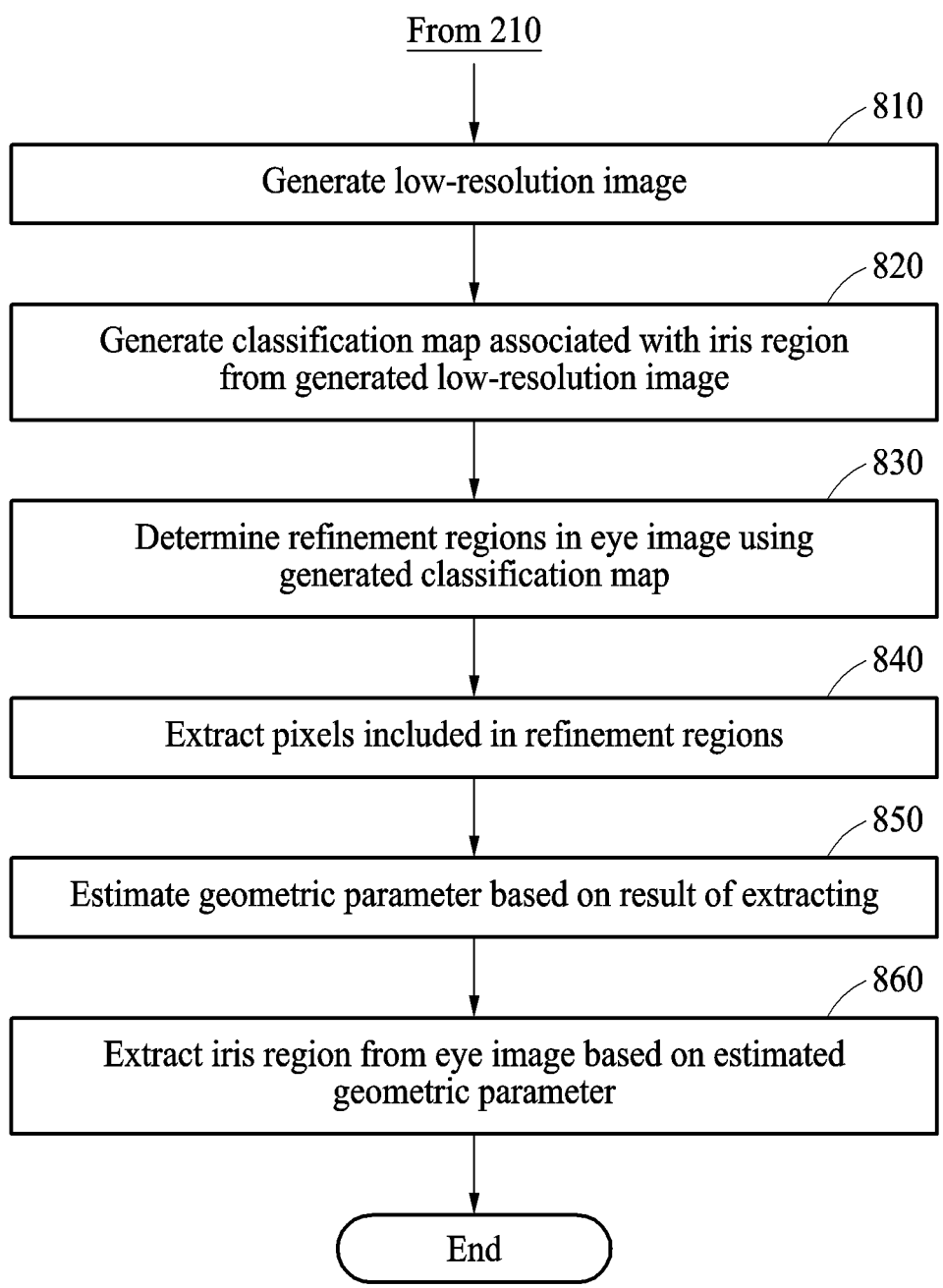
FIG. 8 is a flowchart illustrating an example iris region extraction method.

FIG. 8 is a flowchart illustrating an example iris region extraction method.

According to an example, the iris region extracting apparatus may extract an iris region from an eye image based on a refinement region. The iris region extracting apparatus may determine a plurality of refinement regions in the eye image using a low-resolution image of the eye image, and determine one or more geometric parameters to define the iris region based on a result of extracting pixels from the refinement regions.

Referring to FIG. 8, in operation 810, the iris region extracting apparatus generates a low-resolution image with a resolution lower than a resolution of an eye image by changing the resolution of the eye image, for example. Operation 810 may be identical to operation 610 described with reference to FIG. 6, for example. In operation 820, the iris region extracting apparatus generates a classification map associated with an iris region from the generated low-resolution image using a first neural network model, such as any of the aforementioned neural networks or combination of neural networks described with respect to FIG. 2. Operation 820 may be identical to operation 620 described with reference to FIG. 6, for example. The iris region extracting apparatus may, thus, extract or classify pixels from the low-resolution image using the first neural network model. As a result of the extracting, coarse features of the iris region of the eye image may be determined. Operation 820 may be performed based on the low-resolution image, and thus an amount of operation or computation may be relatively smaller than a case of performing classification directly on the entire eye image that may have a relatively high resolution. Here, operation 820 may also be considered a first segmentation for the eye image.

In operation 830, the iris region extracting apparatus determines a plurality of refinement regions in the eye image using the generated classification map. For example, using the classification map, such refinement regions that may be used to perform more refined classifications of the eye image may be more readily determined. A refinement region used herein refers to a partial region selected to extract a more refined feature of the eye image, and for which a higher accuracy in classification of pixels may be needed, for example. The iris region extracting apparatus may determine the refinement regions based on the classification map and geometrical structural information predefined with respect to the iris region. In a case of an iris, geometrical structural information may include, for example, a circle or an ellipse and a curve, which may be predefined structural information. Such predefined geometrical structural information may be information indicating whether the shape of the iris region is to be defined by only two circles respectively defining a contour of a pupil and a contour of an iris, or information further indicating that the shape of the eye may be further defined by a curve to define an occlusion by at least one eye lid, for example, in addition to such two circles, as only non-limiting examples and noting that additional or alternative predefined geometrical structural information be predefined, e.g., before or during the determining of the refinement regions. In one example, locations of the refinement regions may be determined based on points at which straight lines passing through a central point of a pupil region in the classification map and a boundary of the pupil region meet or the straight lines and a boundary of the iris region in the classification map meet. Based on the geometrical structural information associated with a structure of the iris region, an inclination of each of the straight lines passing through the central point of the pupil region may be predetermined. The refinement regions may be partial regions, centered at a point at which the straight lines and the boundary of the pupil region meet or the straight lines and the boundary of the iris region meet. A size and a shape of each of the refinement regions may vary based on embodiment, and sizes and/or shapes of the refinement regions may be different from one another, the refinement regions may be the same size and/or shape, or some of the refinement regions may be of different sizes and/or shapes and some refinement regions may be of the same sizes and/or shapes.

In operation 840, the iris region extracting apparatus extracts pixels included in the refinement regions using a second neural network model, such as any of the aforementioned neural networks or combination of neural networks described with respect to FIG. 2. Here, for example, only image information of the pixels in the refinement regions may be input to the second neural network model, and the second neural network model may perform pixel-unit classification for each of these pixels. For example, the second neural network model may classify the pixels in the refinement regions with respect to the eye image into one of a class corresponding to an iris, a pupil, and a background. The background refers to a region that is not the iris and not the pupil. A neural network model configured to output a result of the classification performed for each pixel may be used as the second neural network model. As the result of the classification, a partial high-resolution classification map associated with the refinement regions may be generated. Here, the classification may be performed only on the refinement regions, which are partial regions, and thus unnecessary operations or computation that may have been performed on other regions, e.g., if the classification was performed on the entire eye image, may be reduced. In this example, operation 840 may be considered a second segmentation for the eye image.

In operation 850, the iris region extracting apparatus estimates geometric parameters associated with the iris region from the eye image based on the result of the classification obtained from operation 840. The iris region extracting apparatus may estimate the geometric parameters by fitting a geometric model to the result of the classification performed on the refinement regions. For example, the iris region extracting apparatus may estimate a circular and/or elliptical geometric parameter, and a curved geometric parameter from the result of the classification performed on the refinement regions through fitting of a circle and/or ellipse and a curve. In operation 860, the iris region extracting apparatus extracts the iris region from the eye image based on the estimated geometric parameters. A process of estimating geometric parameters and extracting an iris region from an eye image based on the estimated geometric parameters is described above, and thus repeated detailed descriptions are omitted here.

In one example, the iris region extracting apparatus may generate a final classification map using geometric parameters associated with an iris region, and extract the iris region from an eye image using the generated final classification map. For example, when the final classification map is applied to the eye image, the iris region extracting apparatus may determine, to be pixels included in the iris region, pixels corresponding to an iris region of the final classification map among pixels included in the eye image. A set of the determined pixels may be extracted as the iris region.

As described with reference to FIG. 8, by determining a plurality of refinement regions, which are partial regions, using a low-resolution image in a first segmentation operation, and extracting an iris region using a result of extracting or classifying pixels in the refinement regions in a second segmentation operation, the iris region may be accurately extracted and also an amount of operation or computation needed to extract the iris region may be reduced.

Figure 9:
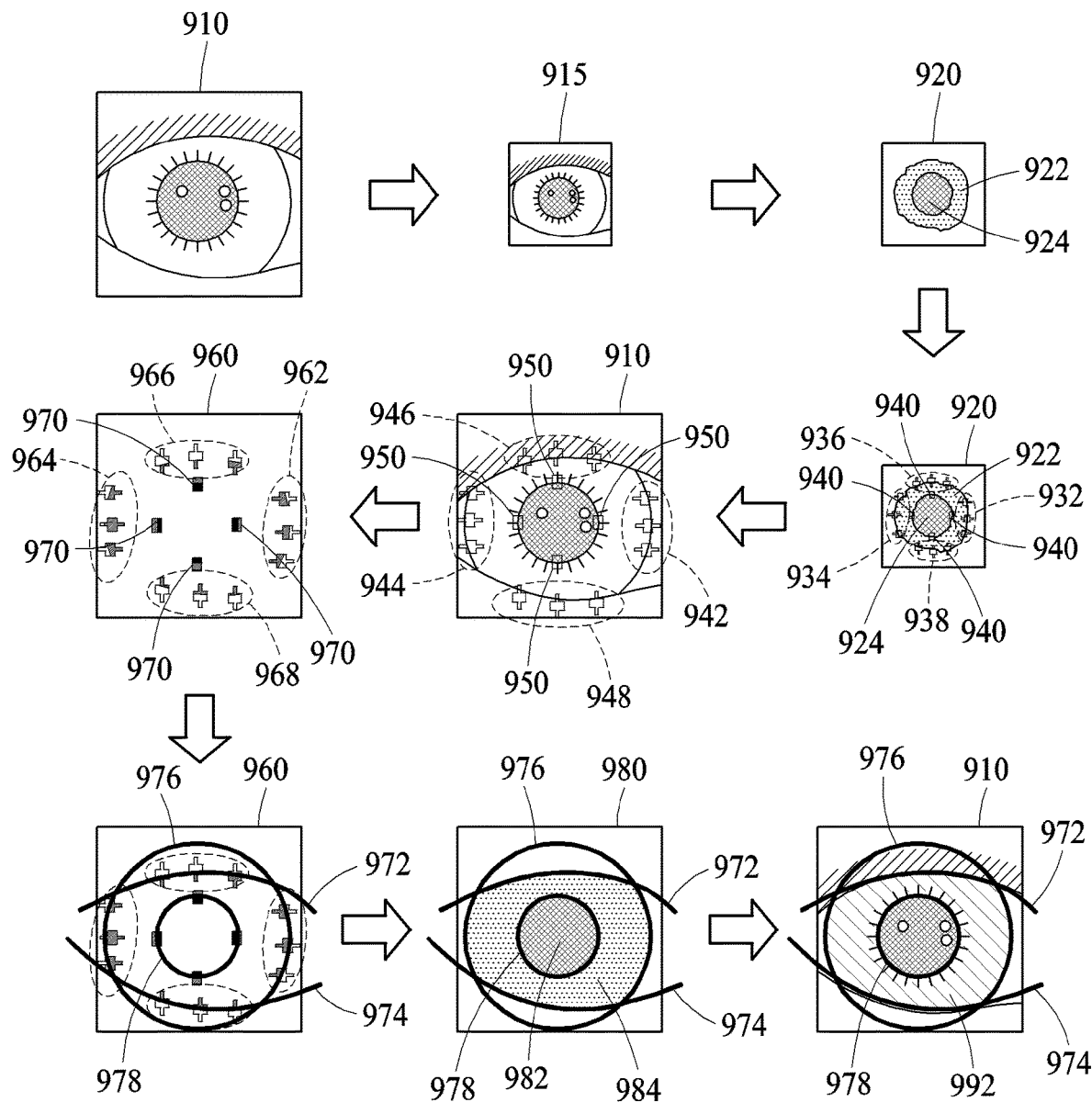
FIG. 9 is a diagram illustrating an example iris region extraction method.

FIG. 9 is a diagram illustrating an example iris region extraction method, such as the iris region extraction method described with reference to FIG. 8, for example.

Referring to FIG. 9, the iris region extracting apparatus generates a low-resolution image 915 by changing a resolution of an eye image 910. The iris region extracting apparatus generates a low-resolution classification map 920 from the low-resolution image 915 using a first neural network model, such as any of the aforementioned neural networks or combination of neural networks described with respect to FIG. 2. The classification map 920 may include a pupil region 924 and an iris region 922. Subsequently, the iris region extracting apparatus determines a plurality of refinement regions to be applied to the eye image 910 using the classification map 920. The refinement regions may include refinement regions corresponding to a boundary of a pupil region, an outer boundary of an iris region, and a boundary of the iris region occluded by an upper eyelid or a lower eyelid, for example. The iris region extracting apparatus determines the refinement regions using the classification map 920 and a geometric model associated with the iris region. The geometric model may include two circles or ellipses to define the pupil region and the iris region, and curves to define shapes of the upper eyelid and/or the lower eyelid, for example.

In one example, refinement regions 950 corresponding to a boundary of a pupil region may be determined as follows: (1) a central point of the pupil region 924 may be estimated from the classification map 920; (2) partial regions 940 around a point at which straight lines spreading at an angle preset based on a horizontal axis, for example, 0° and 90°, while passing through the central point of the pupil region 924, and the boundary of the pupil region 924 meet may be determined; and (3) regions in the eye image 910 corresponding to locations of the partial regions 940 of the classification map 920 may be determined to be the refinement regions 950 corresponding to the boundary of the pupil region.

In an example, refinement regions 942 and 944 corresponding to an outer boundary of an iris region may be determined as follows: (1) partial regions 932 and 934 around a point at which straight lines spreading at an angle preset based on the horizontal axis, for example, 0°, 15°, and 165° counterclockwise, while passing through the central point of the pupil region 924, and a boundary of the iris region 922 meet may be determined; and (2) regions in the eye image 910 corresponding to locations of the partial regions 932 and 934 of the classification map 920 may be determined to be the refinement regions 942 and 944 corresponding to the outer boundary of the iris region.

In an example, refinement regions 946 and 948 corresponding to a boundary of an iris region occluded by an upper eyelid and a lower eyelid may be determined as follows: (1) partial regions 936 and 938 around a point at which straight lines spreading at an angle preset based on the horizontal axis, for example, 75°, 90°, and 115°, while passing through the central point of the pupil region 924, and the boundary of the iris region 922 meet may be determined; and (2) regions in the eye image 910 corresponding to locations of the partial regions 936 and 938 of the classification map 920 may be determined to be the refinement regions 946 and 948 corresponding to the boundary of the iris region occluded by the upper eyelid and the lower eyelid.

Accordingly, in an example, the iris region extracting apparatus may extract or classify pixels included in the refinement regions 942, 944, 946, 948, and 950 of the eye image 910 using a second neural network model, such as any of the aforementioned neural networks or combination of neural networks described with respect to FIG. 2 and as discussed above with respect to FIG. 8. The second neural network model may classify the pixels more specifically than the first neural network model. For example, there may be more pixel information available to provide insight to the classification operation due to the use the eye image 910, than previously available for classification of pixels of the low-resolution image 915, and the second neural network model may be configured to perform more precise classification determinations or inferences. As a result of the extracting or the classifying by the second neural network model, a high-resolution classification map 960 indicating which region, for example, of a pupil, an iris, and a background, each pixel in the refinement regions 942, 944, 946, 948, and 950 belongs to may be generated. The high resolution term used herein may indicate that a resolution of the classification map 960 is relatively higher than the resolution of the classification map 920.

The iris region extracting apparatus estimates geometric parameters to define an iris region from pixel classification results 962, 964, 966, 968, and 970 indicated in the classification map 960. The iris region extracting apparatus estimates a geometric parameter 978 to define a pupil region from the pixel classification result 970 using a circle or ellipse fitting method, and estimates a geometric parameter 976 to define an outer boundary of an iris from the pixel classification results 962 and 964. In addition, the iris region extracting apparatus estimates a geometric parameter 972 to define a boundary of an iris region occluded by an upper eyelid from the pixel classification result 966 using a curve fitting method. The iris region extracting apparatus estimates a geometric parameter 974 to define a boundary of an iris region occluded by a lower eyelid from the pixel classification result 968.

According to an example, the iris region extracting apparatus may selectively generate a classification map 980 based on the estimated geometric parameters 972, 974, 976, and 978. The classification map 980 may include a pupil region 982 defined by the geometric parameter 978, and an iris region 984 defined by the geometric parameters 972, 974, 976, and 978.

The iris region extracting apparatus extracts an iris region 992 from the eye image 910 using the geometric parameters 972, 974, 976, and 978, or the classification map 980. The iris region extracting apparatus extracts, as the iris region 992 from the eye image 910, a region in the eye image 910 defined by the geometric parameters 972, 974, 976, and 978, or a region corresponding to the iris region 984 of the classification map 980.

As described above, the iris region extracting apparatus may perform highly accurate classification on partial regions in an eye image to extract an iris region from the eye image. Thus, the iris region extracting apparatus may extract the iris region more accurately and rapidly. In addition, the iris region extracting apparatus may reduce resources needed to extract the iris region. Still further, the iris region extracting apparatus may then compare features of the extracted iris region 992 to features of registered iris regions, and approve or reject an authentication of the eye image based on a result of that comparison.

Figure 10:
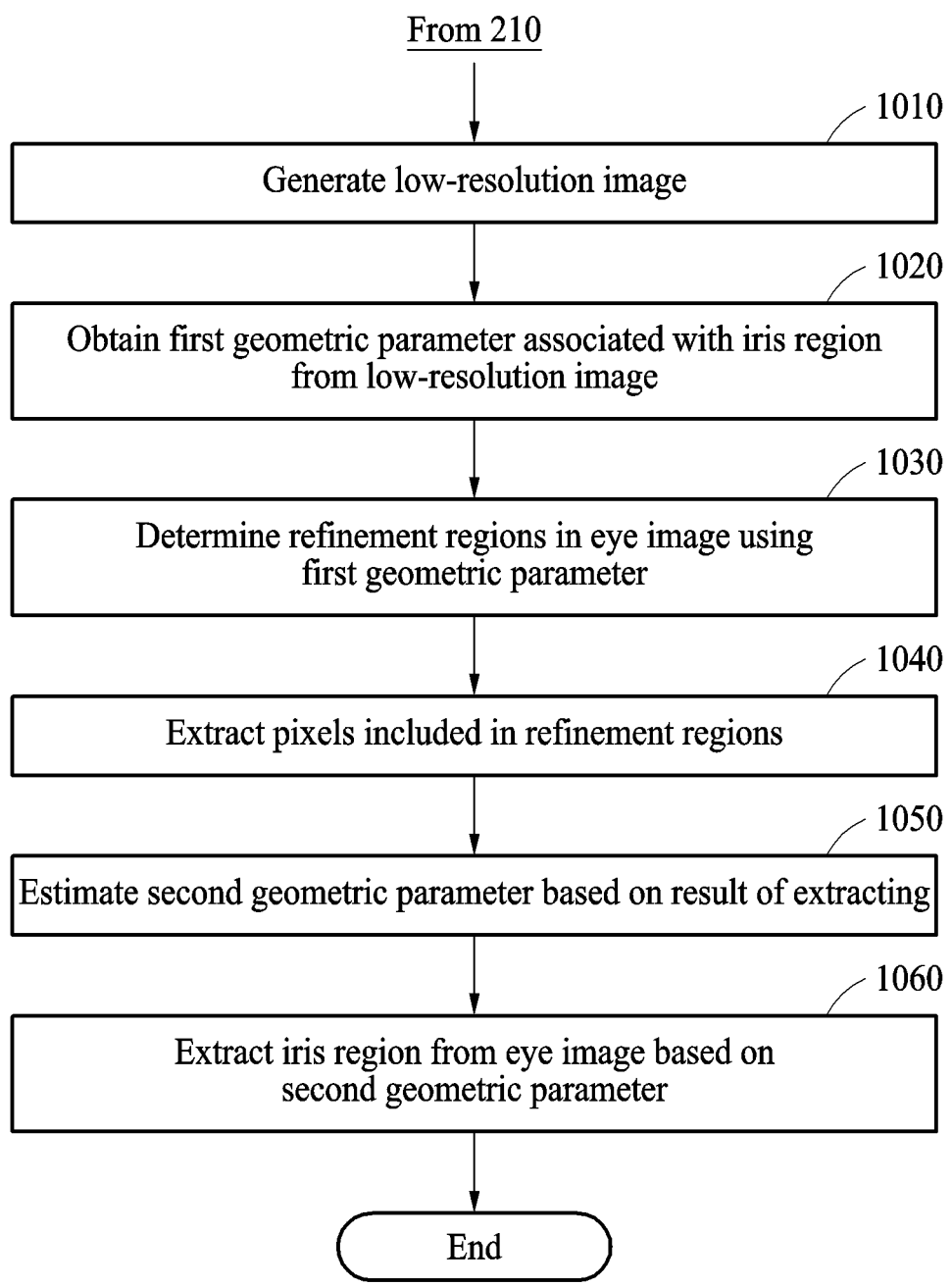
FIG. 10 is a flowchart illustrating an example iris region extraction method.

FIG. 10 is a flowchart illustrating an example iris region extraction method.

Referring to FIG. 10, in operation 1010, the iris region extracting apparatus generates a low-resolution image with a resolution lower than a resolution of an eye image by changing the resolution of the eye image. In operation 1020, the iris region extracting apparatus obtains a first geometric parameter associated with an iris region from the generated low-resolution image using a first neural network model, such as any of the aforementioned neural networks or combination of neural networks described with respect to FIG. 2. For example, when image information of the low-resolution image is input to the first neural network model, the first neural network model may obtain the first geometric parameter associated with a geometric structure of the iris region in the low-resolution image. The first geometric parameter may include information associated with a circle or an ellipse and a curve to define a shape of each of a pupil and an iris. The first neural network model may be a neural network model pre-trained to output geometric parameters associated with the iris region based on the input image information.

In operation 1030, the iris region extracting apparatus determines a plurality of refinement regions in the eye image using the first geometric parameter. The iris region extracting apparatus may determine a coarse iris region and a coarse pupil region from the eye image using the first geometric parameter, and determine refinement regions based on predefined geometrical structural information. In one example, locations of the refinement regions may be determined based on points at which straight lines passing through a central point of the coarse pupil region determined in the eye image and a boundary of the coarse pupil region meet or the straight lines and a boundary of the coarse iris region determined in the eye image meet. The refinement regions may be partial regions, centered at a point at which the straight lines and the boundary of the pupil region or the iris region meet, for example. A size and a shape of each of the refinement regions may vary based on embodiment, and sizes and/or shape of the refinement regions may be different from one another, they may be the same size and/or shape, or some of the refinement regions may be of different sizes and/or shapes and some refinement regions may be of the same sizes and/or shapes. Dissimilarly to the example illustrated in FIG. 6, the iris region extracting apparatus may determine the refinement regions without using a classification map, for example.

In operation 1040, the iris region extracting apparatus extracts pixels included in the refinement regions using a second neural network model, such as any of the aforementioned neural networks or combination of neural networks described with respect to FIG. 2. In operation 1050, the iris region extracting apparatus estimates a second geometric parameter associated with the iris region from the eye image based on a result of the extracting performed in operation 1040. In operation 1060, the iris region extracting apparatus extracts the iris region from the eye image based on the estimated second geometric parameter. Operations 1040 through 1060 described with reference to FIG. 10 may correspond to operations 840 and 860 described with reference to FIG. 8, and thus a more detailed and repeated description of operations 1040 through 1060 is omitted here.

Figure 11:
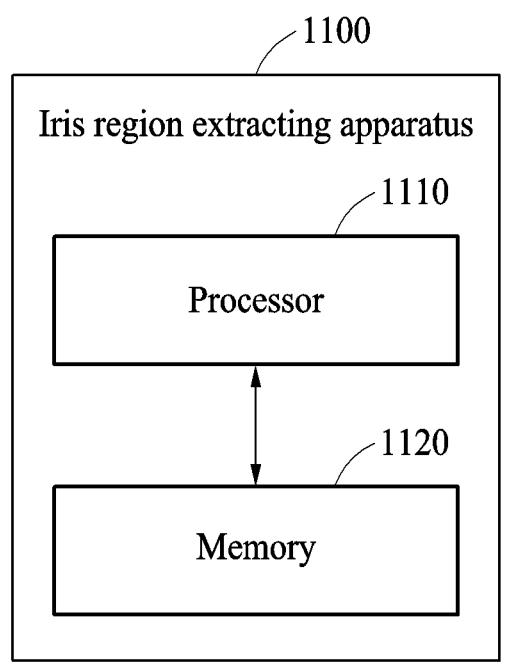
FIG. 11 is a diagram illustrating an example apparatus configured to perform iris region extraction according to one or more embodiments.

FIG. 11 is a diagram illustrating an example apparatus that is configured to perform iris region extraction according to one or more or all methods described herein. As illustrated in FIG. 11, an iris region extracting apparatus 1100 may extract an iris region from an input image including an eye region. Referring to FIG. 11, the iris region extracting apparatus 1100 includes a processor 1110 and a memory 1120, for example.

The processor 1110 may perform one or more or all operations described with reference to FIGS. 1 through 10. For example, the processor 1110 may be configured to obtain a classification map and one or more geometric parameters associated with the iris region from the input image using a neural network model, such as any of the aforementioned neural networks or combination of neural networks described with respect to FIG. 2 which may be stored in the memory, for example, and may identify the iris region from the input image using the obtained classification map and the obtained geometric parameter(s). The processor 1110 may extract the identified iris region, and then perform authentication of the extracted iris region, e.g., by comparing features of the extracted iris region to features of reference or registered iris region(s) stored in the memory, for example. For example, the processor 1110 may determine an iris feature of the extracted iris region, and determine whether to authenticate a user based on whether the determined iris feature matches a registered feature. The processor 1110 may be embodied as an array of a plurality of logic gates or alternatively embodied as computing hardware in other forms. The processor 1110 is representative of one or more processors.

The memory 1120 is one or more non-transitory computer readable media that may store instructions, such that when executed by the processor 1110, cause the processor 1110 to perform one or more or all operations described with reference to FIGS. 1 through 10, store a result of calculations performed by the iris region extracting apparatus 1100, and store one or more of the aforementioned neural networks. The memory 1120 may include, for example, a high-speed random access memory (RAM), and a nonvolatile computer readable storage medium, for example, at least one disk storage device, a flash memory device, and other nonvolatile solid state memory devices.

Figure 12:
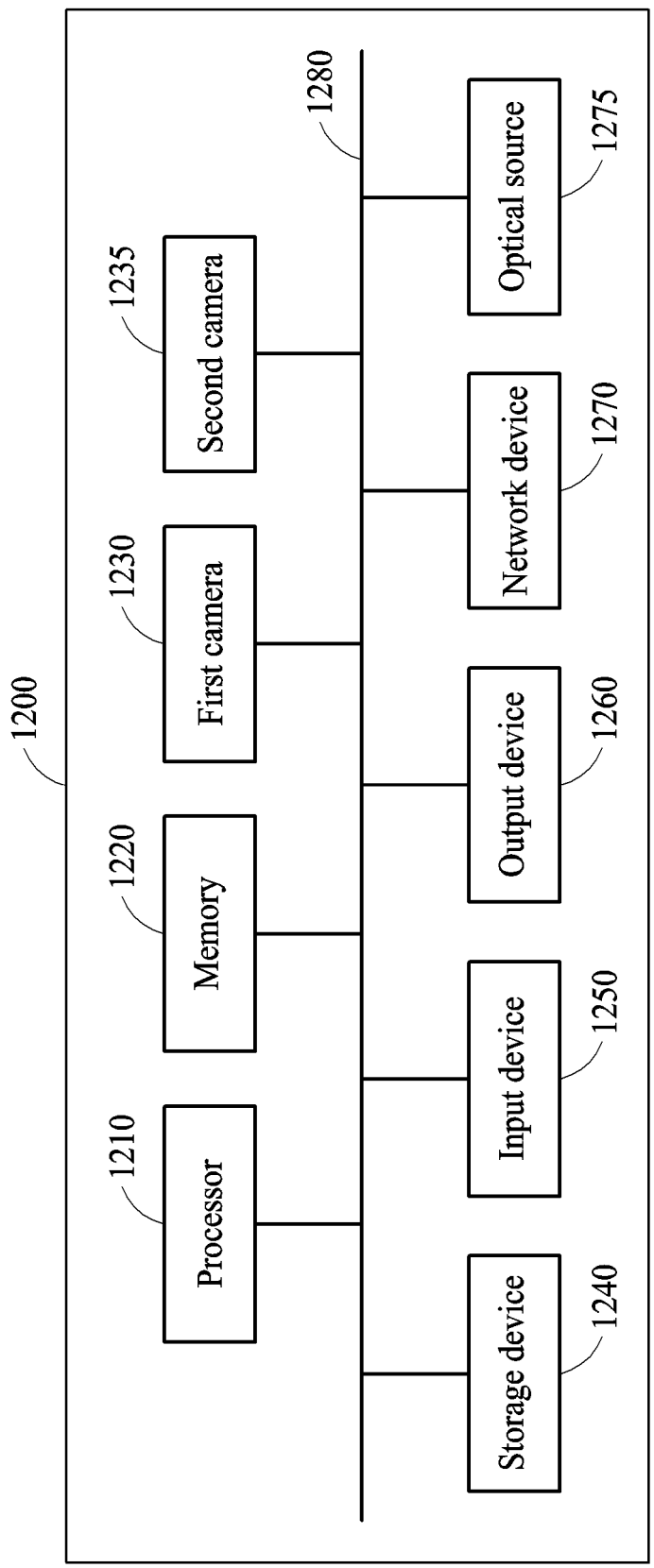
FIG. 12 is a diagram illustrating an example computing apparatus configured to perform iris region extraction according to one or more embodiments.

FIG. 12 is a diagram illustrating an example computing apparatus configured to perform iris region extraction according to one or more or all methods described herein.

As illustrated in FIG. 12, a computing apparatus 1200 may obtain an image that includes an eye region of a user, and extract an iris region from the obtained image. The computing apparatus 1200 may first perform a region of interest (ROI) or cropping of the obtained image before performing the iris region extraction, such as to focus the iris region extraction on a resultant image that is primarily or only of one or more eyes, e.g., considering a desired resolution or set dimensions of image input layers of the applied neural network model. The computing apparatus 1200 may extract an iris feature from the extracted iris region, and perform user authentication based on the extracted iris feature. The computing apparatus 1200 may be configured to perform iris extraction operations, such as the iris extraction operations of the iris region extracting apparatus 1100 illustrated in FIG. 11. Referring to FIG. 12, the computing apparatus 1200 includes a processor 1210, a memory 1220, a first camera 1230, a second camera 1235, a storage device 1240, an input device 1250, an output device 1260, a network device 1270, an optical source 1275, and a bus 1280. Each component of the computing apparatus 1200 may exchange data with other components through the bus 1280.

The processor 1210 may perform various functions and instructions to be implemented in the computing apparatus 1200. For example, the processor 1210 may process instructions stored in the memory 1220 or the storage device 1240. The processor 1210 may perform one or more or all operations described above with reference to FIGS. 1 through 11, for example.

The memory 1220 is one or more non-transitory computer readable media that may store information in the computing apparatus 1200. The memory 1220 may include, for example, a computer readable storage medium or a computer readable storage device. The memory 1220 may include, for example, a RAM, a dynamic RAM (DRAM), and a static RAM (SRAM), and a nonvolatile memory in other forms well-known in the relevant art. The memory 1220 may store the instructions to be implemented by the processor 1210, and store related information during software or an application being executed by the computing apparatus 1200, including instructions, that when executed by the processor 1210, cause the processor to implement one or more or all operations described above with respect to FIGS. 1-11. In addition, either or both of the memory 1220 and the storage device 1240 may store the aforementioned neural network models described herein.

The first camera 1230 may capture a still image, a video image, or both of the images. In one example, the first camera 1230 may capture an image input from a user making an attempt at user authentication. The second camera 1235 may capture an infrared image. An infrared ray may be radiated from the optical source 1275, e.g., which radiates an infrared light externally of the computing apparatus 1200, and an infrared ray reflected by the user making an attempt at iris verification may be captured by the second camera 1235.

According to an example, the computing apparatus 1200 may include at least one of the first camera 1230 or the second camera 1235, e.g., at least one of the first camera 1230, only the first camera 1230, at least one of the second camera 1235, only the second camera 1235, or one or more first cameras 1230 and one or more second cameras 1235. The computing apparatus 1200 may include further cameras.

In one example, the computing apparatus 1200 may select an image including a clearer eye region of the user from a first image obtained by the first camera 1230 and a second image obtained by the second camera 1235, and perform iris extraction using only the selected image. For example, the computing apparatus 1200 may select the image from which the iris region is to be extracted based on a determined quality of each of the first image and the second image, and a determined presence of an artifact, for example, a light blur, in the first image and the second image.

The storage device 1240 is one or more non-transitory computer readable media that may include a computer readable storage medium or a computer readable storage device. In one example, the storage device 1240 may store a great amount of information compared to the memory 1220, and store the information for a long period of time. The storage device 1240 may include, for example, a magnetic hard disk, an optical disc, a flash memory, an erasable programmable read-only memory (EPROM), a floppy disk, and a nonvolatile memory in other forms well-known in the relevant art. The storage device 1240 may also store the instructions to be implemented by the processor 1210, and store related information during software or an application being executed by the computing apparatus 1200, including instructions, that when executed by the processor 1210, cause the processor to implement one or more or all operations described above with respect to FIGS. 1-11.

The input device 1250 may receive an input, for example, a tactile input, a video input, an audio input, and a touch input, from the user. The input device 1250 may include, for example, a keyboard, a mouse, a touchscreen, a microphone, and another device configured to detect the input from the user and transfer the detected input to the computing apparatus 1200.

The output device 1260 may provide an output of the computing apparatus 1200 to the user through a visual, auditory, or tactile method. The output device 1260 may include, for example, a liquid crystal display (LCD), a light-emitting diode (LED) display, a touchscreen, a speaker, an oscillator, and another device configured to provide the output to the user. The output device may also include respective output interfaces for external displays, touchscreens, speakers, oscillators, or to other components of a larger or external processing device, such as a device that is provided the extracted iris region and performs an authentication on the same. The output device may also indicate success of an authentication of an extracted iris with a registered iris or features of the same, for example.

The network device 1270 is a hardware module configured to communicate with external devices through a wired and/or wireless networks. The network device 1270 may include, for example, an Ethernet card, an optical transceiver, and a radio frequency (RF) transceiver, or another network interface card configured to transmit and receive information. The network device 1270 may be configured to communicate with the external device using a communication method, for example, Bluetooth, WiFi, a third generation (3G) method, a long term evolution (LTE) method, an a fifth generation (5G) method, as only examples. In an example, in cooperation with control by the processor 1210 and using one or both of the memory 1220 and storage device 1240, the network device 1270 may also receive and store updates or changes to any one or more or all neural networks described herein, including models and instructions for implementing the same through other machine learning models, which are implemented as further embodiments. The network device 1270 may be further configured to provide or transmit an extracted iris region, e.g., according to any of the iris extraction methods described herein, to another processing device that may be remote and for the other processing device's performance of an authentication operation based on the transmitted or provided extracted iris region.

The computing apparatuses, iris region extracting apparatuses, computing apparatus 110, iris region extracting apparatus 1100, processor 1110, memory 1120, computing apparatus 1200, processor 1210, memory 1220, first camera 1230, second camera 1235, storage device 1240, input device 1250, output device 1260, network device 1270, optical source 1275, as only examples, described with respect to FIGS. 1-12 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented iris region extraction method, the method comprising:
   obtaining an image that includes an eye and performing a cropping of the image to obtain an eye image;
   extracting an iris region from the obtained eye image using a trained neural network model;
   extracting features from the extracted iris region; and
   matching the extracted features to registered iris information.

2. The method of claim 1, wherein the extracting of the iris region comprises:
   extracting pixels corresponding to the iris region from the eye image as an output of the trained neural network model.

3. The method of claim 1, wherein the extracting of the iris region comprises:
   generating a lower-resolution image of the eye image by changing a resolution of the eye image;
   generating a classification map associated with the iris region from the lower-resolution image using the trained neural network model;
   estimating one or more geometric parameters associated with the iris region using the generated classification map; and
   extracting the iris region from the eye image based on the estimated one or more geometric parameters.

4. The method of claim 3, wherein the estimating of the one or more geometric parameters comprises:
   adjusting a size of the classification map to match a size of the eye image; and
   estimating the one or more geometric parameters using the adjusted size classification map.

5. The method of claim 1, wherein the extracting of the iris region comprises:
   generating a lower-resolution image of the eye image;
   generating a classification map associated with the iris region from the generated lower-resolution image using a first trained neural network model;
   determining a plurality of refinement regions in the eye image using the generated classification map;
   extracting pixels from the refinement regions using a second trained neural network; and
   extracting the iris region from the eye image based on a result of the extracting of the pixels.

6. The method of claim 5, wherein the determining of the refinement regions comprises:
   determining the refinement regions in the eye image based on the classification map and structural information predefined with respect to iris regions.

7. The method of claim 5, wherein the extracting of the iris region comprises:
   estimating one or more geometric parameters associated with the iris region based on the result of the extracting of the pixels; and
   extracting the iris region from the eye image based on the estimated one or more geometric parameters.

8. The method of claim 1, wherein the extracting of the iris region comprises:
   generating a lower-resolution image of the eye image;
   obtaining a geometric parameter associated with the iris region from the generated lower-resolution image using a first trained neural network model;
   determining a plurality of refinement regions in the eye image using the obtained geometric parameter;
   extracting pixels from the refinement regions using a second trained neural network model; and
   extracting the iris region from the eye image based on a result of the extracting of the pixels.

9. The method of claim 8, wherein the extracting of the iris region comprises:
   estimating one or more geometric parameters associated with the iris region based on the result of the extracting of the pixels; and
   extracting the iris region from the eye image based on the estimated one or more geometric parameters.

10. The method of claim 1, wherein the extracting of the iris region comprises:
    obtaining a geometric parameter associated with the iris region from the eye image using the trained neural network model; and
    extracting the iris region from the eye image based on the obtained geometric parameter.

11. The method of claim 1, wherein the obtaining of the eye image comprises:
    extracting a region of interest (ROI), including the iris region, from the input image, as the obtained eye image.

12. A non-transitory computer-readable storage medium storing instructions that, when executed by a processor, cause the processor to perform the method of claim 1.

13. A processor-implemented iris region extraction method, the method comprising:
    obtaining an eye image; and
    extracting an iris region from the obtained eye image using a trained neural network model, wherein the extracting of the iris region comprises:
    performing a first segmentation of the eye image by providing a lower resolution image of the eye image to a first trained neural network;
    performing a second segmentation of the eye image using a second trained neural network, the second segmentation of the eye image being dependent on results of the first segmentation of the eye image; and
    extracting the iris region from the eye image based on results of the second segmentation.

14. A processor-implemented iris region extraction method, the method comprising:
    obtaining an eye image; and
    extracting an iris region from the obtained eye image using a trained neural network model, wherein the extracting of the iris region comprises:

generating a first classification map associated with the iris region from the eye image using the trained neural network model;

estimating one or more geometric parameters associated with the iris region using the generated first classification map; and extracting the iris region from the eye image based on the estimated one or more geometric parameters.

15. The method of claim 14, wherein the estimating of the one or more geometric parameters includes performing a fitting operation of one or more geometric equations to the first classification map, the fitting including estimating geometric parameters of at least one of a circle, ellipse, or a curve that are fitted to features of the first classification map.

16. The method of claim 15, wherein the one or more geometric parameters include plural geometric parameters, including a first parameter to define a shape of a first circle or a first ellipse corresponding to an outer boundary of the iris region represented in the first classification map and a second parameter to define a shape of a second circle or a second ellipse corresponding to a boundary between the iris region and a pupil region represented in the first classification map.

17. The method of claim 15, wherein the plural geometric parameters further include at least one of a third parameter to define a shape of a first curve corresponding to an upper eyelid or a fourth parameter to define a shape of a second curve corresponding to a lower eyelid.

18. The method of claim 14, wherein the extracting of the iris region comprises:

generating a second classification map based on the estimated one or more geometric parameters; and extracting the iris region from the eye image using the generated second classification map.

19. A processor-implemented iris region extraction method, the method comprising:

obtaining an eye image; and extracting an iris region from the obtained eye image using a trained neural network model, further comprising:

respectively analyzing a first eye image, which is a captured color image of an eye of a user, and a second eye image, which is a captured infrared image of the eye of the user, to select one of the first eye image and the second eye image to be the obtained eye image.

20. An apparatus, comprising:
one or more processors configured to:
obtain an image that includes an eye and perform a cropping of the image to obtain an eye image;
extract an iris region from the obtained eye image using a trained neural network model;
extract features from the extracted iris region; and
match the extracted features to registered iris information.

21. An apparatus, comprising:
one or more processors configured to extract an iris region from an obtained eye image using a trained neural network model, wherein the one or more processors are configured to:
generate a classification map associated with the iris region from the eye image using the trained neural network model;
estimate one or more geometric parameters associated with the iris region using the generated classification map; and
extract the iris region from the eye image based on the estimated one or more geometric parameters.

22. The apparatus of claim 21, wherein, to estimate the one or more geometric parameters, the one or more processors are configured to perform a fitting operation of one or more geometric equations to the classification map, the fitting including estimating geometric parameters of at least one of a circle, ellipse, or a curve that are fitted to features of the classification map.

23. The apparatus of claim 22 wherein the one or more geometric parameters include plural geometric parameters, including a first parameter to define a shape of a first circle or a first ellipse corresponding to an outer boundary of the iris region represented in the classification map and a second parameter to define a shape of a second circle or a second ellipse corresponding to a boundary between the iris region and a pupil region represented in the classification map.

24. An apparatus, comprising:
one or more processors configured to extract an iris region from an obtained eye image using a trained neural network model, wherein the one or more processors are configured to:
generate a lower-resolution image of the eye image;
generate a classification map associated with the iris region from the generated lower-resolution image using a first trained neural network model, with the classification map having a lower resolution than the eye image;
determine a plurality of refinement regions in the eye image using the generated classification map;
extract pixels from the refinement regions using a second trained neural network model; and
extract the iris region from the eye image based on a result of the extracting of the pixels.

25. An apparatus, comprising:
one or more processors configured to extract an iris region from an obtained eye image using a trained neural network model, wherein the one or more processors are configured to:
generate a lower-resolution image of the eye image;
obtain a geometric parameter associated with the iris region from the generated lower-resolution image using a first trained neural network model;
determine a plurality of refinement regions in the eye image using the obtained geometric parameter;
extract pixels from the determined plural refinement regions using a second trained neural network model;
estimate one or more geometric parameters associated with the iris region based on a result of the extracting of the pixels; and
extract the iris region from the eye image based on the estimated one or more geometric parameters.

26. A processor implemented iris region extraction method, the method comprising:
providing a first image for an eye to a first trained neural network to generate an output of the first trained neural network;
estimating one or more geometric parameters by performing a fitting operation of one or more geometric equations using the output of the first trained neural network, the fitting including estimating geometric parameters of at least one of a circle, ellipse, or a curve for an iris region of the eye; and
extracting the iris region from a second image for the eye based on the estimated one or more geometric parameters.

27. The method of claim 26, wherein the extracting of the iris region comprises:

determining a plurality of refinement regions in the second image based on the estimated one or more geometric parameters;

extracting pixels from the refinement regions using a second neural network model; and extracting the iris region from the second image based on a result of the extracting of the pixels.

28. The method of claim 27, wherein the extracting of the iris region comprises:

estimating at least one geometric parameter associated with the iris region based on the result of the extracting of the pixels; and extracting the iris region from the second image based on the estimated at least one geometric parameter.

29. The method of claim 26, wherein the one or more geometric parameters include plural geometric parameters, including a first parameter to define a shape of a first circle or a first ellipse corresponding to an outer boundary of the iris region represented in the output of the first trained neural network and a second parameter to define a shape of a second circle or a second ellipse corresponding to a boundary between the iris region and a pupil region represented in the output of the first trained neural network.

30. The method of claim 26, wherein the first image is an infrared image and the second image is a color image.

* * * * *